US004001683B2

United States Statutory Invention Registration [19]

[11] Reg. Number: H1683

Yamazaki

[45] Published: Oct. 7, 1997

[54] SUPERCONDUCTING MATERIAL

[75] Inventor: Shunpei Yamazaki, Tokyo, Japan

[73] Assignee: Semiconductor Energy Laboratory, Ltd., Kanagawa-ken, Japan

[21] Appl. No.: 474,797

[22] Filed: Jun. 7, 1995

Related U.S. Application Data

[63] Continuation of Ser. No. 286,917, Aug. 8, 1994, abandoned, which is a continuation of Ser. No. 60,714, May 13, 1993, abandoned, which is a continuation of Ser. No. 593,656, Oct. 3, 1990, abandoned, which is a division of Ser. No. 550,793, Jul. 6, 1990, abandoned, which is a continuation of Ser. No. 174,420, Mar. 25, 1988, abandoned.

[30] Foreign Application Priority Data

Mar. 27, 1987 [JP] Japan ..... 62-75201

[51] Int. Cl.[6] ..... H01B 1/00; H01C 13/00

[52] U.S. Cl. ..... 252/500

[58] Field of Search ..... 252/521; 505/123, 505/125, 126, 776, 500, 815, 780; 501/123

[56] References Cited

U.S. PATENT DOCUMENTS

| | | | |
|---|---|---|---|
| 4,797,510 | 1/1989 | Mihelich | 505/500 X |
| 4,826,808 | 5/1989 | Yurek et al. | 252/521 X |
| 4,900,715 | 2/1990 | Cooper et al. | 252/521 X |
| 4,916,116 | 4/1990 | Yamazaki | 505/1 |
| 4,959,345 | 9/1990 | Yamazaki | 505/1 |
| 4,971,667 | 11/1990 | Yamazaki | 204/192.32 |

OTHER PUBLICATIONS

"High–Pressure Study of the New Y–Ba–Cu–O Superconducting Compound System", Hor et al., *Physical Review Letters,* vol. 58, No. 9, Mar. 2, 1987, pp. 911–912.

"Lattice Instability and High–T Superconductivity in $La_{2-x}Ba_xCuO_4$", Jorgansen et al., *Physical Review Letters,* vol. 58, No. 10, Mar. 9, 1987, pp. 1024–1027.

"Band Properties and Superconductivity in $La_{2-y}X_yCuO_4$", Mattheiss, *Physical Review Letters,* vol. 58, No. 10, Mar. 9, 1987, pp. 1028–1030.

"Evidence for Superconductivity above 40 K in the La–Ba–Cu–O Compound System", Chu et al., *Physical Review Letters,* vol. 58, No. 4, Jan. 26, 1987, pp. 405–407.

"Superconductivity at 52.5 K in the Lanthanum–Barium–Copper–Oxide System", Chu et al., *Reports,* Jan. 30, 1987, pp. 567–569.

"Possible High $T_c$ Superconductivity in the Ba–La–Cu–O System", Bednorz et al., *Condensed Matter,* 64, 1986, pp. 189–193.

"Superconductivity above Liquid Nitrogen Temperature: Preparation and Properties of a Family of Perovskite–Based Superconductors", Engler et al., *J. Am. Chem. Soc.,* 109, 1987, pp. 2848–2849.

(List continued on next page.)

*Primary Examiner*—Charles T. Jordan
*Assistant Examiner*—Meena Chelliah
*Attorney, Agent, or Firm*—Sixbey, Friedman, Leedom & Ferguson, P.C.

[57] ABSTRACT

A superconducting composition is provided to essentially consist of a superconducting material and Li(lithium), Na(sodium), and K(potassium) mixed in an amount up to 0.2% by weight of of the composition into the superconducting material.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

"Preparation and Properties of the Compounds $Ln_2CuO_4$ (Ln=La, Pr, Nd, Sm, Eu, Gd) and Some of Their Solid Solutions", Shaplygin et al., *Russian Journal of Inorganic Chemistry,* 24(6), 1979, pp. 820–824.

"Superconductivity at 40K in $La_8SiO_2CuO_4$", Politts et al., *Condensed Matter,* 66, 1987, pp. 141–144.

Chemical Abstracts, CA 109:161912, for BR 8,702,554 (Nov. 1987).

Engler, E.M., et al., "Processing, Structure, and High–Temperature Superconductivity", *Chemistry of High–Temperature Superconductors,* ACS Symposium Series, 351 (1987), pp. 266–271.

Tarascon, J.M., et al., "Oxygen and rare–earth doping of the 90–K superconducting perovskite $YBa_2Cu_3O_{7-x}$", *Physical Review B,* 36(1) (1 Jul. 1987), 226–234.

SUPERCONDUCTING MATERIAL

This is a Continuation application of Ser. No. 08/286,917, filed Aug. 8, 1994 abandoned; which is a Continuation of Ser. No. 08/060,714, filed May 13, 1993, abandoned; which itself is a continuation of Ser. No. 07/593,656, filed Oct. 3, 1990, abandoned; which is a division of Ser. No. 07/550,793, filed Jul. 6, 1990, abandoned; which is a continuation of Ser. No. 07/174,420, filed Mar. 25, 1988, abandoned.

BACKGROUND OF THE INVENTION

1. Field of the Invention

The present invention relates to an oxide ceramic superconducting material, and more particularly to a composition wherein the temperature of a superconducting material at which electrical resistance becomes zero (which is referred to as Tco hereinafter) approaches a room temperature as much as possible.

2. Background of the Invention

Conventionally, a metallic composition including elements such as mercury and lead, alloys such as NbN, $Nb_3Ge$, $Nb_3Ga$, or three-element compounds such as $Nb_3(Al_{0.8}Ge_{0.2})$ are used as superconducting materials. However, the onset of the superconducting critical temperature (which is referred to as Tc hereinafter) is as low as 25° K.

On the other hand, in recent years, superconducting ceramic materials have been attracting a lot of attention. The Zurich Research Laboratory of IBM first reported these materials in the form of the Ba-La-Cu-O (balacuo) type of high-temperature oxide superconducting bodies. In addition, the cupric oxide—lanthanum—strontium (LSCO) type is also known. These materials are known in the form $(A_{1-x}B_x)_yCuO_z$, where x=0.01 to 0.3, y=1.3 to 2.2, z=2.0 to 4.0. However, the Tc onset, that is the temperature at which superconducting begins for this material is no more than 30° K.

However, there is the possibility that the superconductivity of these oxide ceramic materials is associated with a perbuscite-type structure. Up to now, no consideration has been given to impuirities, with the attitude taken that if the starting raw materials are 99% pure, this is adequate. For this reason, absolutely no consideration has been given to impurities, especially alkali metal elements, halogen elements, nitrogen and carbon, which are mixed into the synthesized superconducting material.

The inventor of the present invention has discovered, during efforts to improve the Tco and Tc of the superconducting ceramic materials, that these impurities collect at the boundaries of the ceramic particles and act as a barrier between the particles to which they adhere, so that they interfere with the electrical conductivity. In such conditions, it is not possible to increase the current density, and the Tco is lower than expected.

Therefore, it is strongly desired that steps taken to increase the Tco, preferably to the temperature of liquid nitrogen (77° K) or greater.

SUMMARY OF THE INVENTION

An object of the present invention is to provide, with due consideration to the drawbacks of such conventional materials, a superconducting material, utilizing new materials of high purity, which exhibits superconductivity at high temperatures, so that the Tc onset occurs between 80° K and 124° K.

A further object of the present invention is to provide a lower density of impurities contained throughout the superconducting ceramic material represented by the expression $(A_{1-x}B_x)_yCu_zO_w$.

Accordingly, a superconducting composition is provided to essentially consist of a superconducting material and no more than 0.2% by weight of Li(lithium), Na(sodium), and K(potassium) mixed into the superconducting material.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
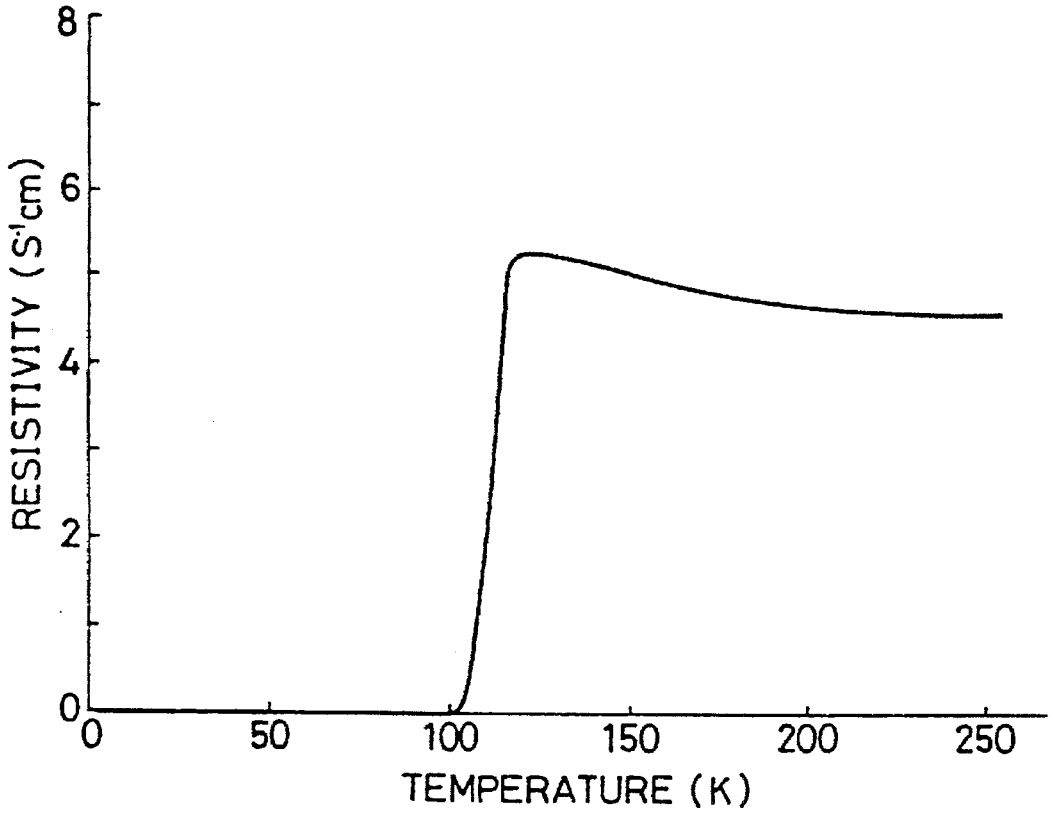
FIG. 1 is a graph showing the characteristics of the superconducting material made according to the present invention.

To satisfy these objects of the present invention, a ceramic superconducting material is made to essentially consist copper, oxygen and at least one element selected from the group of Groups 11a and 111a of the Periodic Table. One example of a general formula representing the molecule of this ceramic superconducting material is $(A_{1-x}B_x)_yCu_zO_w$, where x=0 to 1, y=2.0 to 4.0 or preferably 2.5 to 3.5, z=1.0 to 4.0 or preferably 1.5 to 3.5, and w=4.0 to 10.0 or preferably 6 to 8. A is one element selected from the group of the yttrium group and other lanthanides. The yttrium group is defined in "Physic and Chemistry Dictionary" (published Apr. 1, 1963, Iwanami Shoten) as the group includes Y(yttrium), Gd(gadolinium), Yb(ytterbium), Eu(europium), Tb(terbium), Dy(dysprosium), Ho(holnium), Er(erbium), Tm(thulium), Lu(lutetium), Sc(scandium), and other lanthanides. Also, B is at least one element selected from the group of Ra(radium), Ba(barium), Sr(strontium), Ca(calcium), Mg(magnesium), and Be(beryllium).

The composition of the present invention contains copper in a layered configuration, with one layer within one unit cell, or in a symmetric two-layer structure, and is based on a model in which superconductivity is obtained from the orbit of the furthest exterior nucleus electron.

For this reason, raw materials of 99.99% (4N) purity or higher are used rather than the conventionally-used 99(2N) to 99. 95% purity as a starting material. Then, an oxygen atmosphere of a purity in excess of 4N is used rather than air for oxidation, and the material is fired in 5N oxygen and 5N argon, or under vacuum for reduction.

In this way, in a polycrystalline ceramic material, the crystalline grain size can be made larger, and in turn, a structure can be obtained to which the barrier at the crystal boundaries is caused to further disappear. As a result, an even higher Tco is obtained. In this case, ideally there would be a single crystalline structure in the nucleus with no defects.

In the present invention, the oxide or carbon oxides as the starting materials are mixed, compressed or compacted once, and an $(A_{1-x}B_x)_yCu_{zOw}$ type of structure is created from the oxide or carbon oxide.

Then this material is ground to form a fine powder, once again compressed or compacted into tablet form, and fired.

The new type of superconducting ceramic material of the present invention can be formed by an extremely simple process. In particular, oxide or carbon oxide materials of 5N or 6N purity are used as the starting materials, finely ground in a ball mill, and mixed. When this is completed, the respective values for x,y, z, and w in the expression $(A_{1-x}B_x)_yCu_zO_w$ can be optionally varied and controlled stoichiometrically.

The present invention has made it possible to produce ceramic superconducting bodies which have been completely unattainable inthe past.

In the present invention, the respective starting material compounds are substantially the same as the final compound, specifically the compounds including the materials indicated by the expression $(A_{1-x}B_x)_yCu_zO_w$ as a result of finely grinding the material after pre-firing.

Further, a plurality of elements from Groups 11a and 111a of the Periodic Table are blended together in these end material compounds because the copper is more easily obtained in a layered configuration within the molecular configuration. In this way, the impurities which tend to segregate at the particle boundaries of the final compound are removed. In other materials, the respective particles tend to more easily fuse with the adjacent particles. Observation with an electron microscope (×40,000) shows that the spherical and granular particles are packed together in the third example with larger adjacent apertures. On the other hand, in the first example of the present invention, there is a sufficiently high degree of denseness in the packing and therefore only a few apertures are seen in the spheres. The respective polycrystalline particles are clearly seen to be mutually adhering in a face to face relationship. Specifically, the Tc onset and Tco can be presumed to be at a higher temperature in the present invention because the alkali metal elements, halogen elements, carbon, and nitrogen have been removed.

Also, the mechanism of the superconductivity of the superconducting ceramic materials which exhibit the molecular structure of the present invention is presumed to be related to the fact that the copper oxide material has a laminar structure, and this laminar structure has one layer or two layers in one unit cell. The superconductivity is obtained through carriers within this layer.

If the contact area at the boundaries of the layers and the adjacent particles within the molecule is small, this is an extremely large obstacle to providing an increase in the maximum current flow obtained, and an increase in the Tco. The present invention has succeeded for the first time in the world in enlarging the mutual surfaces of the particles and obtaining intimate contact between them by eliminating or reducing the alkali metal elements, halogen elements, carbon, and nitrogen.

The embodiments of the present invention are made in tablet form. However, it is possible to prepare a thin film superconducting ceramic material without the tablet step, dissolving the powder in a solvent after a pre-firing or full firing, coating a substrate or the like with that solution and firing the coated substrate in an oxidizing atmosphere, followed by firing in a reducing atmosphere.

The superconducting ceramic material for use in accordance with the present invention also may be prepared consistent with the stoichiometric formulae $(A_{1-x}B_x)_yCu_zO_w$, where A is one or more elements of Group IIIa of the Periodic Table, e.g., the rare earth elements, B is one or more elements of Group IIa of the Periodic Table, e.g., the alkaline earth metals including beryllium and magnesium, and x=0 to 1, y=2.0 to 4.0, preferably 2.5 to 3.5; z=1.0 to 4.0, preferably 1.5 to 3.5; and w=4.0 to 10.0, preferably 6.0 to 8.0. Also, superconducting ceramics for use in accordance with the present invention may be prepared consistent with the stoichiometric formulae $(A_{1-x}B_x)_yCu_zO_w$, where A is one or more elements of Group Vb of the Periodic Table such as Bi, Sb, and As. B i s one or more elements of Group IIa of the Periodic Table, e.g., the alkaline earth metals including beryllium and magnesium, and x=0 to 1; y=2.0 to 4. 0, preferably 2.5 to 3.5; z=1.0 to 4.0, preferably 1.5 to 3.5; and w=4.0 to 10.0, preferably 6.0 to 8.0. One example of the former formulae is $YBa_2Cu_3O_x$(x=6 to 8), and examples of the latter formulae are $BiSrCaCu_2O_x$ and $Bi_4Sr_3Ca_3Cu_4O_x$ain addition, the composition $Bi_4$ $(Sr_yCa_2)$ $Cu_4O_x$ is possible for such purposes and its Tc is 40 to 60 when the value of y is about 1.5. The Tconset and Tco of the composition $Bi_4Sr_4Ca_2Cu4O_x$ are 110° K and 79° K, respectively. The value of x in the above formulae is estimeated to be 6 to 10, for example about 8.1.

The superconducting material is also generally represented as $(A_{1-x}B_x)_yCu_zO_w$ wherein x=0 to 1; y=2.0 to 4.0; w=4.0 to 10.0; and A is at least one element selected from the group of Ga, Zr, Nb, and Ge, and B is at least one element selected from the group of alkali earth metals. Specifically, desirable ranges are; x=0.1 to 1;y=2.5 to 3.5; z=1.5 to 3.5; w=7.0 to 8.0.

The stoichiometric formulae mentioned above can be determined for example by X-ray diffracton.

(EXAMPLE 1)

In Example 1 of the present invention, Y was used as A and Ba as B in the general expression.

As starting materials, yttrium oxide ($Y2O_3$) was used as the yttrium compound, barium carbonate ($BaCO_3$) as the barium compound, and copper oxide (CuO) as the copper compound. These were used in the form of fine powders with a purity of 99.99% or higher. The proportions were selected, so that x=0.33 (A:B=2:1), y=3, z=3, and w=6 to 8. Ba for the B and B' and Ca were selected in a 1:1 ratio.

These materials were thoroughly blended in a mortar, washed well with highly purified water (specific resistance 18M ohms or greater) using an ultrasonic treatment, and then dried. In this way, alkali metal elements such as Li(lithium), Na(sodium), or K(potassium) and the like could be adequately washed out in this process. It was therefore possible to reduce the concentration of impurities throughout the finished material to 0.2% by weight, or preferably 0.005% by weight or less. This blended powder was then inserted into a capsule and formed into tablets (10 mm diameter×3 mm) at a load of 30 kg/cm$^2$. The tablets were then heated and oxidized in an oxidizing atmosphere, for example, in air at 500° C. to 1000° C., and, for example, 700° C. for 8 hours.

This process is referred to as the pre-firing process.

Next, this material was ground and blended in a mortar to an average particle radius of 10 μm or less.

This blended powder was sealingly inserted into a capsule and formed into tablets by compressing at a load of 50 kg/cm$^2$. The methods may also be adopted in a hot press system where the tablet is heated while it is being pressed, or in which an electric current is applied to the tablet, so that a light elecrtric current flows through the tablet while the tablet is being heated.

Next, an oxidizing process was performed at between 500° C. and 1000° C., for example at 900° C., in an oxidizing atmosphere such as an atmosphere of highly purified oxygen, and full firing was carried out for 10 to 50 hours, for example, 15 hours.

Then this sample material was heated in a low oxygen $O_2$-Ar mixture (with other impurities at 10 ppm or less) for 3 to 30 hours at 600° C. to 1100° C., for example, and for 20 hours at 800° C., for reduction, resulting in a new structure which was observed clearly.

Using this sample material, the relationship between the specific resistance and temperature was determined. The highest temperature obtained for the Tc onset was observed to be 114° K, while the Tco was observed to be 103° K. The amount of impurities present was measured by means of a Secondary Ion Mass Spectrometer (SIMS). The amount of nitrogen and carbon dioxide were 0.1% or less by weight, specifically measured at only 0.01% by weight. The halogen elements detected were 0.1% or less by weight, specifically detected at only 0.001% by weight. The alkali metal elements were 0.2% or less by weight, specifically detected at only 0.001% by weight.

FIG. 1 shows the temperature versus specific resistance characteristics of the superconducting material of the present invention which was obtained n this example.

(EXAMPLE 2)

In Example 2 of the present invention, Yb was blended as the oxide compound. Ba was used as B, Sr as $B^-$, with $y:y^-=1:1$. As starting materials, ytterbium oxide and yttrium oxide were used. Barium carbonate( $BaCO_3$) was used as the barium compound, and $Sr_2O_3$ as the strontium compound. Also, CuO was used as the copper compound. In all other respects this example was the same as the first example.

The Tc onset obtained was 119° K, and Tco 107° K in this example.

(EXAMPLE 3)

This example was made on the basis of a conventional method for comparison.

As in Example 1, the starting materials were 3N in purity. The material was blended in the form of fine powders, but only a simple washing with city water being performed rather than ultrasonic washing with highly purified water. Other manufacturing conditions remained the same. The Tc in this case was only 92° K and Tco only 74° K. The results of analyses for impurities run on the formed tablets gave 0.3% by weight for sodium in the alkali metal elements, and 0.5% by weight for carbon and nitrogen.

(EXAMPLE 4)

similar processes were carried out except that other materials such as magnesium (Mg) and beryllium (Be) were used as B The results obtained was substantially the same as in the first example.

What is claimed is:

1. A copper-oxide superconducting material which has a critical temperature Tco greater than 77° K, said material including alkali metal elements at less than 0.2 weight % and said ceramic material being generally represented as $(A_{1-x}B_x)_yCu_zO_w$, where x =0 to 1, y=2.0 to 4.0, z=1.5 to 3.5 and w=4.0 to 10.0, wherein A is an element selected from the group of Y (yttrium), Gd (gadolinium), Yb (ytterbium), Eu (europium), Tb (terbium), Dy (dysprosium), Ho (holmium), Er (erbium), Tm (thulium), Lu (lutetium), Sc (scandium), and other lanthanides; and B is an element selected from among Ra (radium), Ba (barium), Sr (strontium), Ca (calcium), Mg (magnesium), and Be (beryllium).

2. The superconducting ceramic material of claim 1 wherein A is yttrium, and B is barium.

3. The superconducting ceramic material of claim 1 wherein said alkali metals are at least one of lithium, sodium, and potassium.

4. A copper-oxide superconducting material which has a critical temperature Tco greater than 77° K, said material including halogen elements at less than 0.1 weight % and said ceramic material being generally represented as $(A_{1-x}B_x)_yCu_zO_w$, where x=0 to 1, y=2.0 to 4.0, z=1.5 to 3.5 and w=4.0 to 10.0 wherein A is an element selected from the group of Y (yttrium), Gd (gadolinium), Yb (ytterbium), Eu (europium), Tb (terbium), Dy (dysprosium), Ho (holmium), Er (erbium), Tm (thulium), Lu (lutetium), Sc (scandium), and other lanthanides; and B is an element selected from among Ra (radium), Ba (barium), Sr (strontium), Ca (calcium), Mg (magnesium), and Be (beryllium).

5. The superconducting ceramic material of claim 4 wherein A is yttrium, and B is barium.

6. The superconducting ceramic material of claim 4 wherein said halogen elements are at least fluorine.

7. A copper-oxide superconducting material which has a critical temperature Tco greater than 77° K, said material including alkali metal elements less than 0.2 weight %.

8. The superconducting ceramic material of claim 7 wherein said alkali metals are at least one of lithium, sodium, and potassium.

9. A copper-oxide superconducting material which has a critical temperature Tco greater than 77° K and a laminar structure including two layers of said copper-oxide;

wherein said material has the formula $AB_2Cu_3O_w$, in which A is at least one element selected from the group consisting of Y (yttrium), Gd (gadolinium), Yb (ytterbium), Eu (europium), Tb (terbium), Dy (dysprosium), Ho (holmium), Er (erbium), Tm (thulium), Lu (lutetium), Sc (scandium), and other lanthanides; B is at least one element selected from the group consisting of Ra (radium), Ba (barium), Sr (strontium), Ca (calcium), Mg (magnesium), and Be (beryllium), and w ranges from 6 to 8; and wherein said material includes less than 0.2 weight % of alkali metal.

* * * * *